MOS TETRODE

Filed Oct. 13, 1966

Inventors:
JOHN OLMSTEAD
LEWIS A. JACOBUS, JR. &
ELEFTHERIOS G. ATHANASSIADIS
By Abraham Sherman
Attorney Inventors:
JOHN OLMSTEAD,
LEWIS A. JACOBUS, JR. &
ELEFTHERIOS G. ATHANASSIADIS
By Abraham Sherman
Attorney Inventors:
JOHN OLMSTEAD,
LEWIS A. JACOBUS, JR. &
ELEFTHERIOS G. ATHANASSIADIS
By Abraham Sherman
Attorney Inventors:
JOHN OLMSTEAD,
LEWIS A. JACOBUS, JR. &
ELEFTHERIOS G. ATHANASSIADIS
By Abraham Sherman
Attorney Inventors:
JOHN OLMSTEAD,
LEWIS A. JACOBUS, JR. &
ELEFTHERIOS G. ATHANASSIADIS
By Abraham Sherman
Attorney United States Patent Office 3,427,514
Patented Feb. 11, 1969

3,427,514
MOS TETRODE

John Olmstead, Somerville, Lewis A. Jacobus, Jr., Middlesex, and Eleftherios G. Athanassiadis, Lebanon, N.J., assignors to Radio Corporation of America, a corporation of Delaware Filed Oct. 13, 1966, Ser. No. 586,411
U.S. Cl. 317—235 9 Claims
Int. Cl. H01l 11/00, 15/00

ABSTRACT OF THE DISCLOSURE

An insulated-gate field-effect semiconductor device is described comprising a crystalline semiconductive body having spaced source and drain regions adjacent one body face; source and drain electrodes on the one body face; two insulated gate electrodes on the one body face between the source and drain regions; and a common source-drain region less than 0.64 mil wide adjacent the one major face and between the two insulated gate electrodes.

BACKGROUND OF THE INVENTION

*Field of the invention*

This invention relates to improved semiconductive devices, and particularly to improved insulated-gate field-effect tetrode semiconductor devices.

*Description of the prior art*

The type of semiconductor device in which the conductivity of a portion of a semi-conductive body or wafer may be modulated by an applied electric field is known as a field-effect device. The portion of the semiconductive body which has its conductivity modulated is known as the channel. One kind of field-effect device has a dielectric or insulating layer over a portion of the surface of a crystalline semiconductive body, and has a control electrode deposited on this insulating layer. Units of this kind are known as insulated-gate field-effect devices, and may comprise a body of crystalline semiconductive material, two spaced conductive regions adjacent to one face of said semiconductive body, a film of insulating material on said one face between said two spaced regions, two electrodes bonded respectively to the two spaced conductive regions, and a control electrode on the insulating film between the two spaced regions. The channel of the device is a portion of the semiconductive body between the two spaced conductive regions and beneath the insulating film and control electrode. Similar devices may be made wherein the semiconductive material is in the form of a thin layer deposited on an insulating substrate.

One class of insulated-gate field-effect device is known as the MOS (metal-oxide-semiconductor) transistor, and is described by S. R. Hofstein and F. D. Heiman in "The Silicon Insulated-Gate Field-Effect Transistor," Proceedings IEEE 51, p. 1190, September 1963. In devices of of this type, the semiconductive body generally consists of silicon; the insulator usually consists of silicon oxide; the control electrode on the insulating film is also known as the gate electrode; and the two electrodes bonded directly to the semiconductive wafer are known as the source and drain electrodes.

While most field effect devices have only one control or gate electrode, it is known that insulated-gate field-effect transistors may be made with a plurality of control electrodes between the source and drain electrodes. See for example J. T. Wallmark, U.S. Patent 2,900,531, issued Aug. 18, 1959, and P. K. Weimer U.S. Patent 3,258,663, issued June 28, 1966. When a device of this class has two separate control or gate electrodes, it may be described as a tetrode, since it has four separate electrodes.

It is an object of this invention to provide improved semiconductor devices.

Another object is to provide improved field-effect semiconductor devices.

Still another object is to provide improved insulated-gate field-effect tetrode transistors.

*The drawing*

The invention and its features will be described by the following examples, considered in conjunction with the accompanying drawing, in which:

FIGURES 1*a*–1*d* are cross-sectional elevational views of a semiconductor body illustrating successive steps in the fabrication of a semiconductor tetrode device according to one embodiment of the invention;

THE PREFERRED EMBODIMENTS

*Example 1*

Figure 1A:
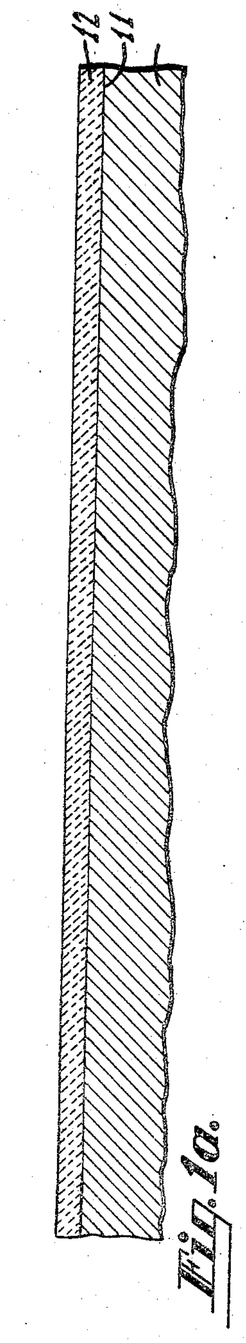

A crystalline semiconductive body 10 (FIGURE 1*a*) is prepared with at least one major face 11. The exact size, shape, composition, and conductivity of semiconductive body 10 is not critical. The semiconductive body 10 may consist of: germanium; silicon; a germanium-silicon alloy; the nitrides, phosphides, arsenides or antimonides of boron, aluminum, indium or gallium; or the sulfides, selenides or tellurides of zinc, cadmium or mercury. In this example, the semiconductive body 10 is about 50 mils square, about 6 mils thick, consists of monocrystalline silicon, and is of P type conductivity. The resistivity of the semiconductive body 10 is preferably at least 1 ohm-cm., and is about 20 ohm cms. in this example.

A coating of material 12 which serves as a diffusion mask is deposited on face 11. Coating 12 may for example consist of silicon oxide, silicon nitride, silicon oxynitride, or the like, and may, for example, be deposited from the vapor phase or genetically grown. In this example, coating 12 consists of silicon oxide, and is formed by heating the silicon body 10 in an oxidizing ambient such as steam or oxygen.

Figure 1B:
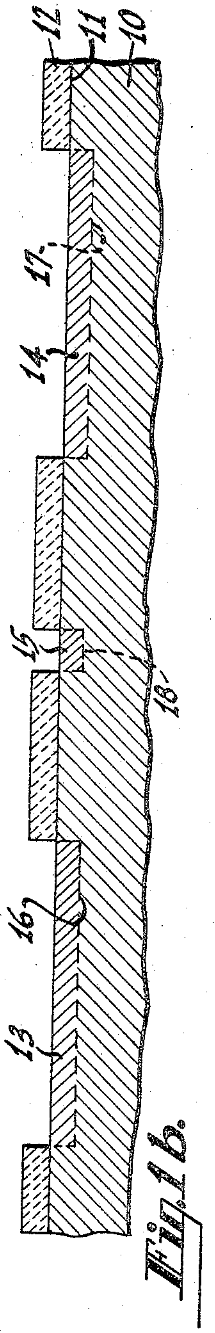

Two spaced low-resistivity regions 13 and 14 (FIGURE 1*b*) of conductivity type opposite to that of the bulk of body 10 are formed in semiconductive body 10 immediately adjacent face 11 by standard diffusion techniques known to the art. At the same time, a third such region 15 is formed in body 10 immediately adjacent to major face 11, and spaced between the two regions 13 and 14. Appropriate windows are formed in masking coating 12 by etching, and a suitable vaporized conductivity modifier is diffused into the portions of wafer face 11 thus exposed. Since the body 10 is P type in this example, a donor such as arsenic, antimony, phosphorus, or the like is diffused into the exposed portions of face 11. To insure low resistivity in regions 13, 14 and 15, the diffusion is accomplished under such conditions of source concentration and heating profile that the concentration of charge carriers (electrons in this example) at the surface of regions 13, 14 and 15 is at least $10^{19}$ per cm.$^3$. PN junctions 16, 17 and 18 are formed at the boundaries between the P type bulk of the body 10 and the N type diffused regions 13, 14 and 15 respectively. The precise size and shape of the source and drain regions is not critical. The regions 13 and 14 may be of the same size and shape, or may differ in this respect. In this example, regions 13 and 14 are about 10 mils long and 0.4 mil wide. Preferably, region 15 is spaced equidistant between regions 13 and 14.

It has now been found that the width of the intermediate diffused region 15 (which region is also termed the island diffusion) is a critical factor in the high frequency performance of the device. In order to obtain satisfactory performance at frequencies above 100 MHz., it has now been found that the width of the intermediate diffused region 15 should be less than 0.64 mil. The probable physical reasons for this limitation are discussed hereinafter. In this example, the intermediate region 15 is 0.4 mil wide and 10 mils long.

Figure 1C:
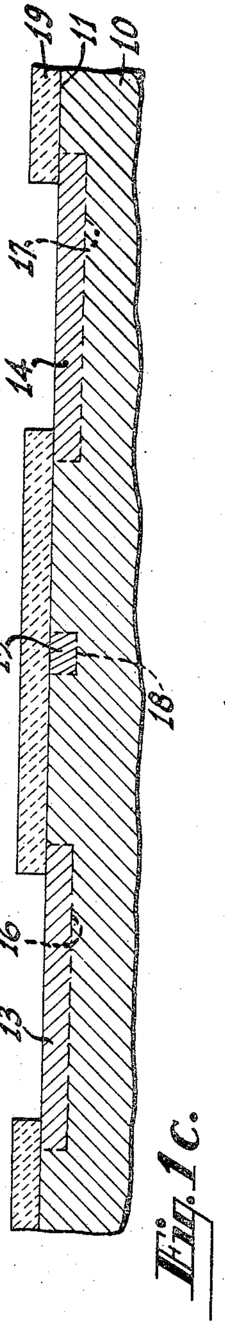

The masking coating 12 is removed, and a layer 19 (FIGURE 1*c*) of dielectric or insulating material is deposited on face 11 of body 10. The dielectric layer 19 may consist of silicon monoxide, silicon dioxide, silicon nitride, silicon oxynitride, silicon carbide, magnesium oxide, magnesium fluoride, titanium carbide, titanium oxide, hafnium oxide, vanadium oxide, aluminum oxide, or the like. In this example, layer 19 consists of silicon oxide. Standard masking and etching techniques are utilized to form two windows or openings in layer 19, one window being internal region 13, and the other window being internal region 14.

A metal such as aluminum, palladium, chromium or the like is deposited by any convenient method, for example by evaporation through a mask, on the exposed portion of wafer regions 13 and 14, and also on portions of the dielectric layer 19 over the gap or space between regions 13 and 14. One metallic contact or electrode 20 is thus formed to region 13; another metallic contact or electrode 21 is formed to region 14. A third metallic electrode 22 is formed on the dielectric layer 19 over the gap between regions 13 and 15; and a fourth electrode 23 is formed on dielectric layer 19 over the gap between regions 14 and 15. In operation, electrodes 20 and 21 serve as the source and drain electrodes respectively; electrode 22 serves as the first or input gate; and electrode 23 serves as the second or control gate. Electrical leads 24, 25, 26 and 27 may be attached to electrodes 20, 21, 22 and 23 respectively. Conveniently, lead wires 24, 25, 26 and 27 are aluminum or gold wires attached to electrodes 20, 21, 22 and 23 respectively by ultrasonic or by thermocompression bonding. The device may then be encapsulated and cased by standard techniques known to the semiconductor art.

Figure 1D:
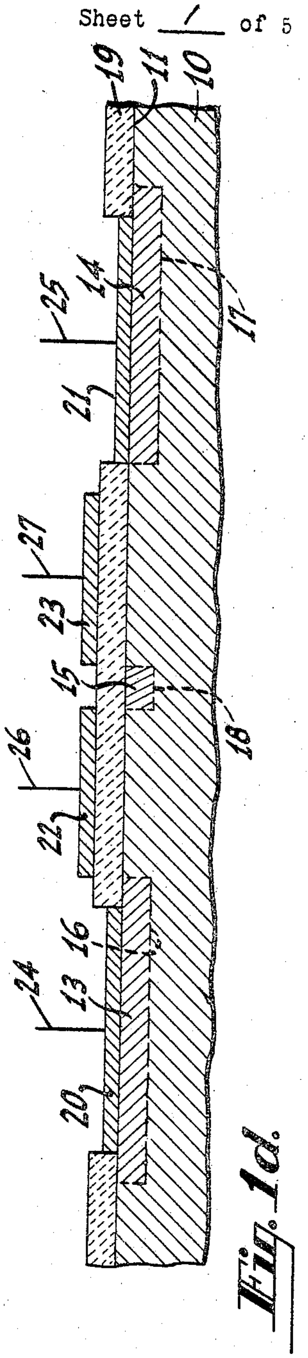
Figure 2:
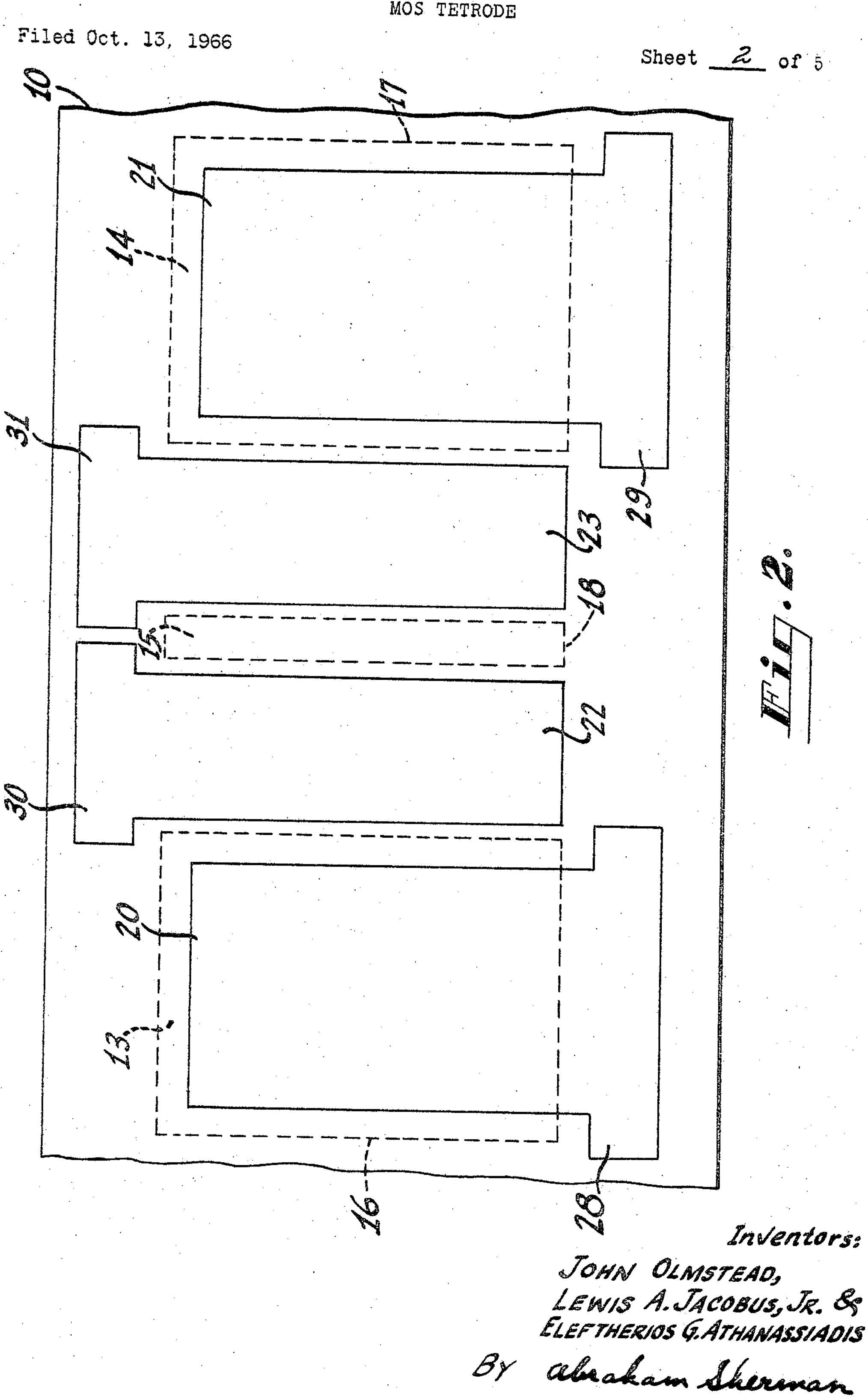
FIGURE 2 is a plan view of the device of FIGURE 1*d*.

FIGURE 1*d* is schematic in several respects. The four electrical lead wires 24–27 are shown bonded directly to the narrow electrodes 20–23 respectively. In practical commercial devices, it is more convenient to terminate each electrode in a broadened area known as a bonding pad. The bonding pads have sufficient area so that the electrical lead wires may be readily attached to them. Moreover, each of the bonding pads are preferably disposed on the surface of the dielectrical layer 19, thus preventing contact of the electrical lead wire attached to the bonding pad with undesired portions of semiconductive face 11. As shown in the plan view of FIGURE 2, the electrodes 20, 21, 22 and 23 of the device of FIGURE 1*d* preferably terminate in bonding pads 28, 29, 30 and 31 respectively. Advantageously, the electrical leads 24, 25, 26 and 27 are attached to the bonding pads 28, 29, 30 and 31 respectively.

In the operation of the device, the diffused region 15 acts as a drain region for the source region 13, and at the same time acts as a source region for the drain region 14. The effect obtained is that of two separate insulated-gate field-effect transistors connected in cascade, so that the output of the first transistor (comprising source region 13, first or input gate electrode 22, and drain region 15) becomes the input of the second transistor (comprising source region 15, second or control gate electrode 23, and drain region 14).

It has unexpectedly been found that although the intermediate diffused region 15 has no electrical connections thereto, it improves the life stability of the electrical parameters of the device of this embodiment as compared with a similar device which does not contain the intermediate diffused region 15. Moreover, it has been found that the high frequency power gain for a given second or control gate-to-source voltage is substantially improved by the presence of the diffused region 15.

DIMENSIONAL ANALYSIS OF ISLAND DIFFUSION WIDTH

It can be shown that the forward transconductance $Y_{21}$ of the tetrode MOS device such as that of this example can be considered as the transconductance of a first MOS transistor (associated with the first or input gate electrode) and a second MOS transistor (associated with the second or control gate electrode) connected in cascade, and expressed as follows:

(1)
$$Y_{21}=\frac{\left[gm-jw\left(\frac{C_g}{2}+C_f\right)\right]\left[gm'-jw\frac{C'_g}{2}\right]}{gm'+jw\frac{C'_g}{2}+C_f+C_{SS}}$$

wherein $gm$ equals the transconductance of the first MOS unit associated with the first or input gate electrode, $j$ equals the square root of $-1$, $w$ equals the angular frequency in radians per second, $C_g$ equals the gate-to-channel capacitance for the first MOS transistor unit, $C_f$ equals the feedback capacitance of the first MOS unit, $gm'$ equals the transconductance of the second MOS unit associated with the second or control gate electrode, $C'_g$ equals the gate-to-channel capacitance for the second MOS unit, and $C_{SS}$ is the depletion layer capacitance of the island diffusion.

For a VHF device it is essential that the forward transconductance $Y_{21}$ be high. From Equation 1 it can be seen that if (2)
$$C_{SS}\geq\frac{C'_g}{2}+C_f$$

then $Y_{21}$ will be degraded and the VHF performance of the device will be reduced.

The quantity $C'_g/2$ can be expressed as:

(3)
$$C'_g/2=E_{ins}zc/2t_{ins}$$

where $E_{ins}$ is the dielectric constant of the insulator beneath the second or control gate electrode, $c$ is the distance from the island diffusion to the drain, $t_{ins}$ is the thickness of the insulator beneath the second or control gate electrode, and $z$ is the length of the island diffusion and of the conductive channel in the direction perpendicular to the plane of the paper.

The feedback capacitance $C_f$ can be considered as composed of two parts: a first part $C_{fo}$ due to the overlap of the diffused regions by the electrodes; and a second part $C_{ff}$ due to stray fields distributed along the length of the channel. Hence, when all the insulating layers in the device are of the same thickness, (4) $$C_f = C_{fo} + C_{ff}$$

It can be shown that $C_{ff}$ equals ⅓ $C_{fo}$. Therefore, (5) $$C_f = C_{fo} + \tfrac{1}{3} C_{fo}$$

The quantity $C_{fo}$ can be expressed as (6) $$C_{fo} = E_{ins} ze / t_{ins}$$

where $e$ is the width of that portion of the first gate electrode which overlaps the island diffusion.

Combining Equations 5 and 6, (7) $$C_f = C_{fo} + \tfrac{1}{3} E_{ins} ze / t_{ins}$$

If the thickness of the insulating layer over the island diffusion is different from the thickness of the insulating layer over the channel, which may happen in commercial devices, then the $C_{fo}$ is reduced by the ratio of the two insulator thicknesses. Hence, when the insulator thicknesses vary, (8) $${}_sC_{fo} = E_{ins} ze / t'_{ins}$$

where ${}_sC_{fo}$ is the overlap feedback capacitance for a tetrode MOS device having stepped insulator thicknesses, and $t'_{ins}$ is the thickness of the insulating layer beneath the overlapping portion of the first or input gate electrode.

By combining Equations 7 and 8, one obtains:

(9) $$C_f = E_{ins} ze / t'_{ins} + \tfrac{1}{3} E_{ins} ze / t_{ins}$$

For convenience we can consider that $t'_{ins} = a t_{ins}$, where $a$ is a pure number. In order for the effect of $C_{ss}$ on $Y_{21}$ to be negligible, we require

(10) $$C_{SS} \ll \frac{C'_g}{2} + C_f$$

Substituting Equations 3 and 9 into Equation 10 gives:

(11) $$C_{ss} << E_{ins} ze / 2t_{ins} + E_{ins} ze / a t_{ins} + \tfrac{1}{3} E_{ins} ze / t_{ins}$$

We may consider that $e$ will be some portion of $c$, so that $e = bc$, where $b$ is a pure number. Then

(12) $$C_{ss} \ll E_{ins} zc / 2t_{ins} + b E_{ins} zc / a t_{ins} + \tfrac{1}{3} E_{ins} zc / t_{ins}$$

Combining terms in Equation 12 gives:

(13) $$C_{SS} \ll \frac{E_{ins} zc}{t_{ins}} \left[ 0.5 + \frac{b}{a} + \frac{b}{3} \right]$$

The quantity $C_{ss}$, which is the depletion layer capacitance of the island diffusion, may also be expressed as:

(14) $$C_{ss} = \frac{E_{sor} zd}{t_{dl}}$$

wherein $t_{dl}$ is the depletion layer thickness, $E_{sor}$ is the dielectric constant of the semiconductor, and $d$ is the width of the island diffusion.

Combining Equations 13 and 14 gives:

(15) $$\frac{E_{sor} zd}{t_{dl}} \ll \frac{E_{ins} zc}{t_{ins}} \left[ 0.5 + \frac{b}{a} + \frac{b}{3} \right]$$

Rearranging the terms in Equation 15 gives:

(16) $$\frac{d}{c} \ll \frac{E_{ins}}{E_{sor}} \cdot \frac{t_{dl}}{t_{ins}} \left[ 0.5 + \frac{b}{a} + \frac{b}{3} \right]$$

The depletion layer thickness $t_{dl}$ is given by:

(17) $$t_{dl} = \sqrt{\frac{2E_{sor} V}{q N_a}}$$

where

V is the voltage on the island diffusion, $q$ is the electric charge, and $N_a$ is the impurity concentration in the semiconductor region beneath the island diffusion.

For a typical device, $t_{ins}$ (the thickness of the insulator over the channel) is about 1000 angstroms, and $t'_{ins}$ (the thickness of the insulator underneath the overlapping portion of the gate) is about 7000 angstroms; the number $b$ is 0.5; the number $a$ is 7000/1000 or 7; $E_{ins}$ equals 4; $E_{sor}$ equals 12; and $q$ equals $1.6 \times 10^{19}$ coulombs.

However, the depletion layer thickness of $t_{dl}$ may not exceed 0.5 c., since at this point the depletion layer extending from the drain region would cause "punch through." In order to maintain satisfactory operation, $t_{dl}$ should not exceed 0.25 c., particularly in VHF devices where the spacing between source and drain is small.

Substituting $t_{dl}$ = 0.25 c. in Equation 16 gives:

(18) $$\frac{d}{c} \ll \frac{E_{ins}}{E_{sor}} \cdot \frac{0.25\text{ c.}}{t_{ins}} \left[ 0.5 + \frac{b}{a} + \frac{b}{3} \right]$$

Inserting typical values into Equation 18 for a tetrode MOS device as described gives:

(19) $$\frac{d}{c} \ll \frac{4}{12} \cdot \frac{0.25\text{ c.}}{10^{-5}} [.736]$$

Rearranging Equation 19 gives:

(20) $$d << 6.32 \times 10^3 c^2$$

Substituting for $c$ typical values of $5 \times 10^{-4}$ cm. gives:

(21) $$d << (6.32 \times 10^3)(25.8 \times 10^{-8})$$

Performing the calculation gives:

(22) $$d << 163 \times 10^{-5}\text{ cm.} = 0.64\text{ mil}$$

It is thus seen that Equation 18 sets an upper limit on the width of the central diffused region (or island diffusion) of a tetrode MOS device in terms of the other physical parameters of the device. While the specific values for these parameters which were utilized in Equations 19–22 relate to an MOS tetrode wherein the semiconductor consists of silicon and the insulator consists of silicon oxide, it appears that for the fabrication of practical VHF devices the upper limiting value obtained for $d$, the width of the island diffusion, will not vary much from the value of about 0.64 mil.

Figure 6:
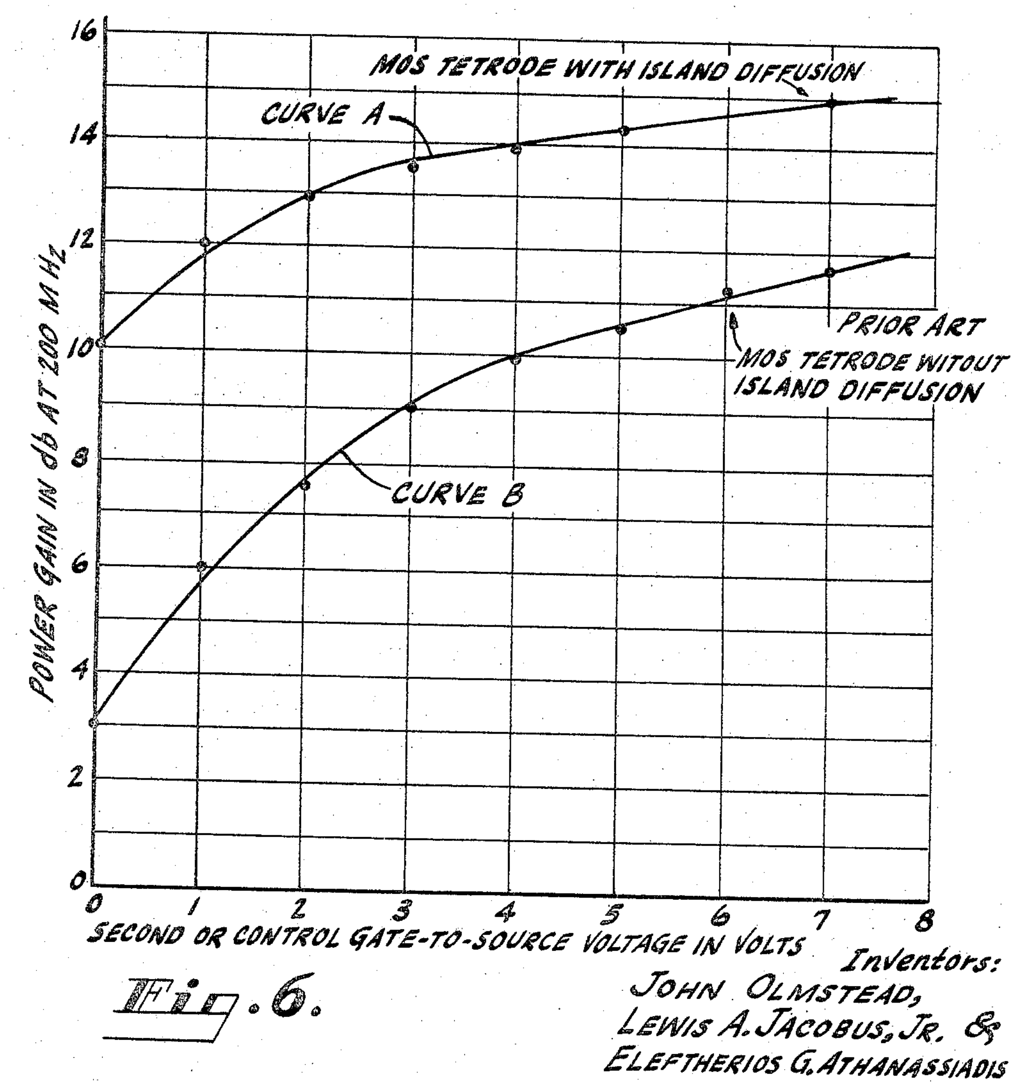

It also appears that no lower limit should be placed on the width of the central diffused region or island diffusion, since the transconductance of the tetrode MOS increases as the width of the island diffusion decreases. Hence, the width of the central diffused region (or island diffusion) should be made as small as the state of the art permits. However, the central diffused region or island diffusion should not be entirely eliminated, since, as shown in FIGURE 6, the power gain of the device is reduced when the island diffusion is eliminated.

*Example II*

In Example I, the source region and the intermediate diffused region (which may be called the island diffusion) and the drain region were co-linear. In the present example, the source region and the island diffusion partly surround the drain region.

Figure 3:
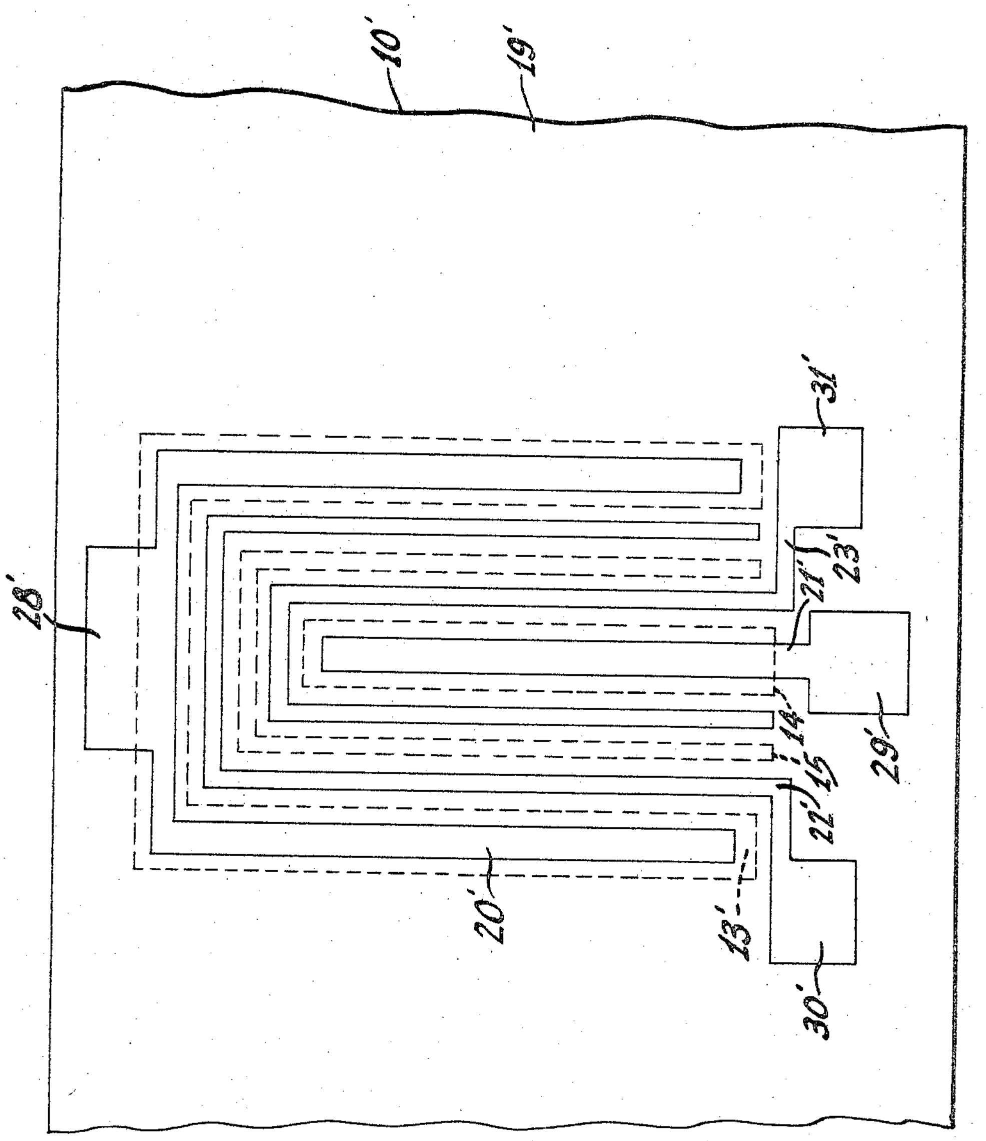
FIGURE 3 is a plan view of a device according to another embodiment.

Referring now to FIGURE 3, the device of this example, comprises a given type conductivity crystalline semiconductive body 10' which may consist of any of the crystalline semiconductive materials mentioned above, or of alloys of them, for example gallium antimonide-indium antimonide alloys, or indium arsenide-indium phosphide alloys. On the major face of body 10' shown in plan view is a layer of dielectric material 19', which may for example consist of silicon nitride, or may be any of the other insulating materials mentioned above.

The source region 13' of the device is U-shaped. Within the U of the source region 13' but spaced therefrom is the drain region 14'. Between the source and drain regions 13' and 14' is a thin U-shaped intermediate region 15'. The width of region 15' is less than 0.64 mil. Regions 13', 14' and 15' are all of opposite type conductivity to that of the semiconductive body 10' so that PN junctions 16', 17' and 18' respectively are formed at the boundaries between regions 13', 14' and 15' respectively and the bulk of body 10'.

A U-shaped metallic electrode 20' serves as contact to the U-shaped source region 13'. An electrode 21' serves as the contact to the drain region 14'. On the dielectric layer 19' and overlying the space between the source region 13' and the diffused region 15' is a first U-shaped gate electrode 22'. Also on the dielectric layer 19' but overlying the space between the diffused region 15' and the drain region 14' is an insulated U-shaped gate electrode 23'. The four device electrodes 20'–23' respectively terminate in the four separate bonding pads 28'–31' respectively on the insulating layer 19'. The device is fabricated by the standard methods described above in connection with Example I, and is completed by attaching electrical lead wires (not shown) to each of the bonding pads 28'–31', and then encapsulating and casing the semiconductor body 10' by standard procedures known to the art.

An advantage of this embodiment, in which the source region partly surrounds the drain region, is that the amount of unmodulated current which can flow between the source and drain regions is minimized.

*Example III*

In the device of this embodiment, the source region and the island diffusion or intermediate region completely surround the drain region.

Figure 4:
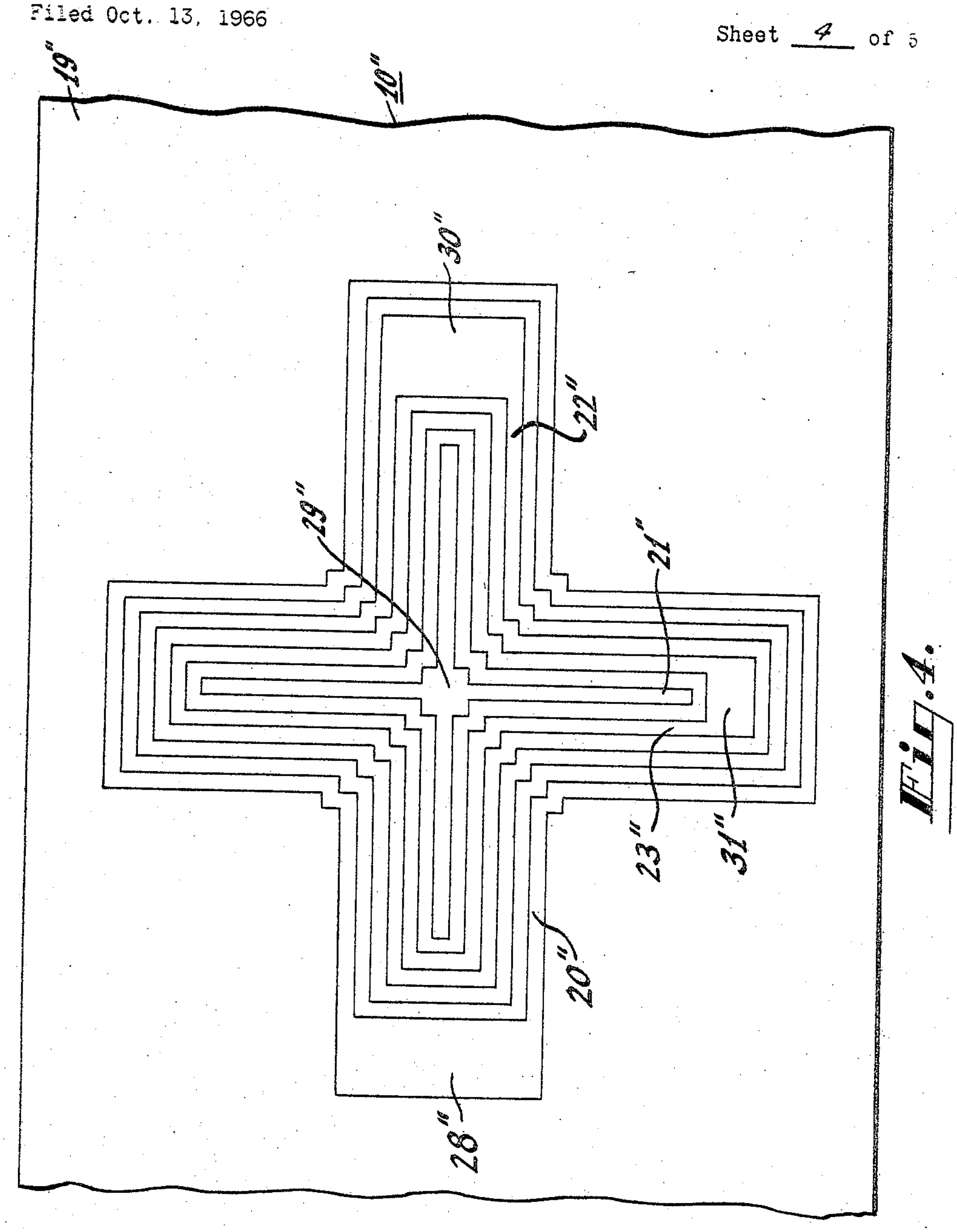
FIGURE 4 is a plan view of a device according to another embodiment.

Referring now to FIGURE 4, the device of this example comprises a given conductivity type crystalline semiconductive body 10''. On the major face of the semiconductive body 10'' which is shown in the plan view, is a layer 19'' of dielectric material.

The device includes an X-shaped drain region, an X-shaped intermediate region closely surrounding the drain region, an X-shaped source region closely surrounding the intermediate region, an X-shaped drain electrode 21'', an X-shaped source electrode 20'', and two X-shaped gate electrodes 22'' and 23'' on the dielectric layer 19'' and spaced between the source and drain electrodes. The source region, the intermediate, and the drain regions are beneath their respective electrodes and are not shown in the drawing for greater clarity, but it will be appreciated that the source region conforms closely to the source electrode, the drain region conforms closely to the drain electrode, and the intermediate region conforms closely to the space between the two gate electrodes 22'' and 23''. In accordance with the invention, the width of the island diffusion is made less than 0.64 mil. The four device electrodes 20''–23'' respectively have four separate bonding pads 28''–31'' respectively on the dielectric layer 19''.

Devices of this type, wherein the source region completely surrounds the drain region, have the advantage that all the current flowing between the source and drain regions is modulated by the gate electrodes. A specific device according to this embodiment, wherein the semiconductive body consisted of monocrystalline silicon, the dielectric layer consisted of silicon oxide, each arm of the X-shaped source region was about 25 mils long, and each electrode was about 0.4 mil wide, was tested for the variation in power gain, measured in decibels, with the variation in the control or second gate-to-source voltage, measured in volts, at a frequency of 200 MHz. The intermediate region or island diffusion was 0.4 mil wide. The characteristic curve thus obtained is shown as curve A in FIGURE 6. For comparison, a similar device was prepared which did not contain the island diffusion or intermediate region between the source and drain region. The characteristic curve of the device thus fabricated is shown as curve B in FIGURE 6. The device according to the invention provided markedly improved power gain over the entire range of applied voltage compared to that provided by a device according to the prior art.

It is known that insulated-gate field-effect devices of the type described herein may be operated in either the enhancement mode or the depletion mode. In order to operate satisfactorily in the depletion mode, the devices are provided with a thin conductive channel, which may be an inversion layer, between the source and drain electrodes. For a complete discussion of the electrical characteristics of insulated-gate field-effect devices in the enhancement mode and in the depletion mode, see chapter 5 and 8 of Wallmark and Johnson, "Field Effect Transistor", Prentiss-Hall Inc., Englewood Cliffs, N.J., 1966. The devices according to this invention may be operated in either the enhancement mode, or, by providing a conductive channel between the source and drain region, may be operated in the depletion mode.

It will be understood that the X-shaped regions of this example are topographically equivalent to closed curves. An equivalent structure may be made with a circular central drain region, an annular source region surrounding the periphery of the drain region but spaced therefrom, an annular intermediate region or island diffusion spaced between the source and drain regions, a first annular (input) gate electrode on a dielectric layer over the space between the source region and the intermediate region, and a second annular (control) gate electrode on the dielectric layer over the space between the drain region and the intermediate region.

*Example IV*

The above embodiments all relate to a field-effect device having a single intermediate region or island diffusion between the source and drain regions, and having two insulated gate electrodes overlying the space between the source and drain electrodes. Analogous devices may be fabricated having a plurality of intermediate regions or island diffusions spaced between the source and drain regions, with the number of insulated gate electrodes in the device being greater by one than the number of island diffusions, as described in this embodiment.

Figure 5:
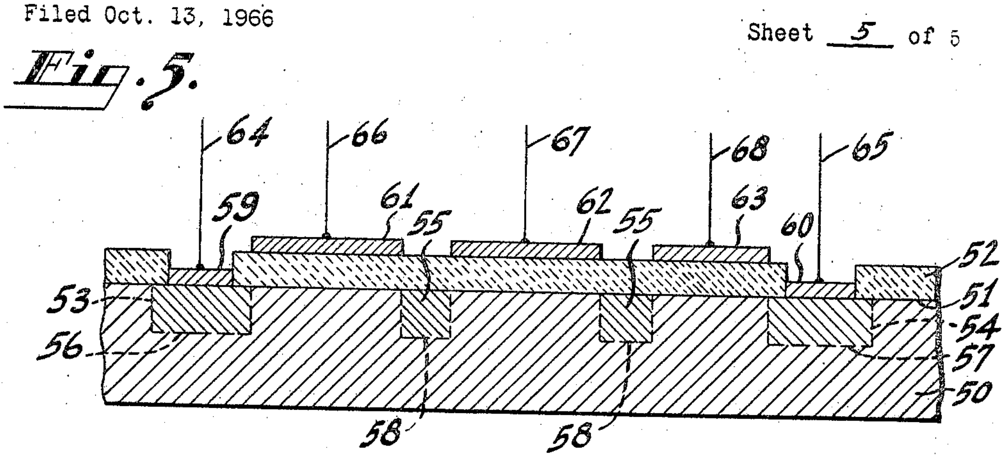
FIGURE 5 is a cross-sectional view of a device having more than two control electrodes according to another embodiment; and, FIGURE 6 is a graph showing the variation in power gain at 200 MHz. with second gate-to-source voltage for a tetrode device according to the invention, and for a comparable prior art device.

Referring now to FIGURE 5, the device of this example comprises a given type conductivity crystalline semiconductor body 50 having at least one major face 51; a dielectric layer 52 on face 51; two spaced opposite conductivity type regions 53 and 54 in body 50 immediately adjacent face 51 and serving as the source and drain regions respectively; a plurality (two in this example) of opposite type conductivity intermediate regions 55 in body 50 immediately adjacent face 51 and spaced apart between the source and drain regions 53 and 54 respectively, each region 55 being less than 0.64 mil wide; rectifying barriers 56, 57 and 58 between the aforesaid opposite type conductivity regions 53, 54 and 55 respectively and given type conductivity body 50; a source electrode 59 on face 51 internal source region 53; a drain electrode 60 on face 51 internal drain region 54; a plurality of spaced gate electrodes 61, 62 and 63 (since there are two island diffusions in this example, there are three gate electrodes) on the dielectric layer 52 overlying the space between the source and drain regions so that each gate electrode overlies the space between a different pair of adjacent regions of opposite type conductivity in body 50. Electrical lead wires 64, 65, 66, 67 and 68 are attached to electrodes 59, 60, 61, 62 and 63 respectively. The device is then encapsulated and cased by standard methods. The device of this example may be utilized to combine several different signals, and thus function in a circuit like a pentagrid converter.

The above examples are by way of illustration only, and not limitation. Different configurations may be utilized for the source and drain regions, and for the device electrodes. The device may be made of thin films of semiconductive material deposited on an insulating substrate as described in the P. K. Weimer patent supra. Other modifications may be made without departing from the spirit and scope of the invention as set forth in the specification and the appended claims.

What is claimed is:

1. An insulated-gate field-effect tetrode device comprising:

a crystalline semiconductive body having at least one major face;

a layer of dielectric material on said one face;

first and second spaced regions of low resistivity in said body immediately adjacent said one face;

a third region of low resistivity in said body immediaately adjacent said one face, said third region being spaced between said first and second regions, the width of said third region being less than 0.64 mil;

a first device electrode on said major face completely internal said first region;

a second device electrode on said major face completely internal said second region;

a third device electrode on said dielectric layer overlying the space between said first region and said third region;

a fourth device electrode on said dielectric layer overlying the space between said second region and said third region; and, electrical connections to said four electrodes.

2. The device as in claim 1, wherein said second region partly surrounds said first region.

3. The device as in claim 1, wherein said crystalline semiconductive body consists of a material selected from the group consisting of germanium, silicon, germanium-silicon alloys, the nitrides, phosphides, arsenides and antimonides of boron, aluminum, indium, and gallium, and the sulfides, selenides and tellurides of zinc, cadmium, and mercury.

4. The device as in claim 1 wherein said dielectric layer consists of a material selected from the group consisting of silicon monoxide, silicon dioxide, silicon nitride, silicon oxynitride, silicon carbide, magnesium oxide, magnesium fluoride, titanium carbide, titanium oxide, titanium nitride, hafnium oxide, vanadium oxide, and aluminum oxide.

5. An insulated-gate field-effect tetrode device comprising:

a given conductivity type crystalline semiconductive body having at least one major face;

a layer of dielectric material on said one face;

a first region of opposite conductivity type in said body immediately adjacent said one face;

a second region of said opposite conductivity type in said body immediately adjacent said one face spaced from but surrounding the periphery of said first region;

two spaced electrodes on said one face, one said electrode being completely internal one said spaced region, and the other said electrode being completely internal the other said spaced region;

two spaced electrodes on said dielectric layer overlying the space between said two regions of opposite conductivity type;

a third region of opposite conductivity type in said body immediately adjacent said major face, said third region being less than 0.64 mil wide and spaced between said two opposite type regions and underlying the space between said two electrodes on said dielectric layer; and, electrical connections to said four electrodes.

6. The device as in claim 5, wherein each said electrode is a metallic mass.

7. The device as in claim 5, wherein said crystalline semiconductive body consists of a material selected from the group consisting of germanium, silicon, germanium-silicon alloys, the nitrides, phosphides, arsenides and antimonides of boron, aluminum, indium and gallium, and the sulfides, selenides and tellurides of zinc, cadmium and mercury.

8. The device as in claim 5, wherein said dielectric layer consists of a material selected from the group consisting of silicon monoxide, silicon dioxide, silicon nitride, silicon oxynitride, silicon carbide, magnesium oxide, magnesium fluoride, titanium carbide, titanium oxide, hafnium oxide, vanadium oxide and aluminum oxide.

9. An insulated-gate field-effect device comprising:

a given conductivity type crystalline semiconductive body having at least one major face;

a layer of dielectric material on said one face;

first and second spaced regions of opposite conductivity type in said body immediately adjacent said one face;

a plurality of regions of said opposite conductivity type in said body immediately adjacent said one face, said regions being spaced between said first and second regions, each said region being less than 0.64 mil wide;

a first device electrode on said one face internal said first region;

a second device electrode on said one face internal said second region;

a plurality of electrodes on said dielectric layer, each said electrode overlying the space between a different pair of adjacent regions of said opposite conductivity type; and, electrical connections to each said electrode.

References Cited

UNITED STATES PATENTS

| | | | |
|---|---|---|---|
| 3,349,474 | 10/1967 | Rauscher | 317—235 |
| 3,355,598 | 11/1967 | Tuska | 317—235 |

FOREIGN PATENTS

| | | |
|---|---|---|
| 1,037,850 | 8/1966 | Great Britain. |

OTHER REFERENCES

IBM Technical Disclosure Bulletin, "An And Gate Using Single FET" by Brennemann et al. vol. 7, No. 1, June 1964, p. 7.

JOHN W. HUCKERT, *Primary Examiner.*

J. D. CRAIG, *Assistant Examiner.*

U.S. Cl. X.R.

307—304